W. H. SAWYER.
METHOD OF TREATING SEWAGE.
APPLICATION FILED FEB. 1, 1917.
1,242,986.
Patented Oct. 16, 1917.
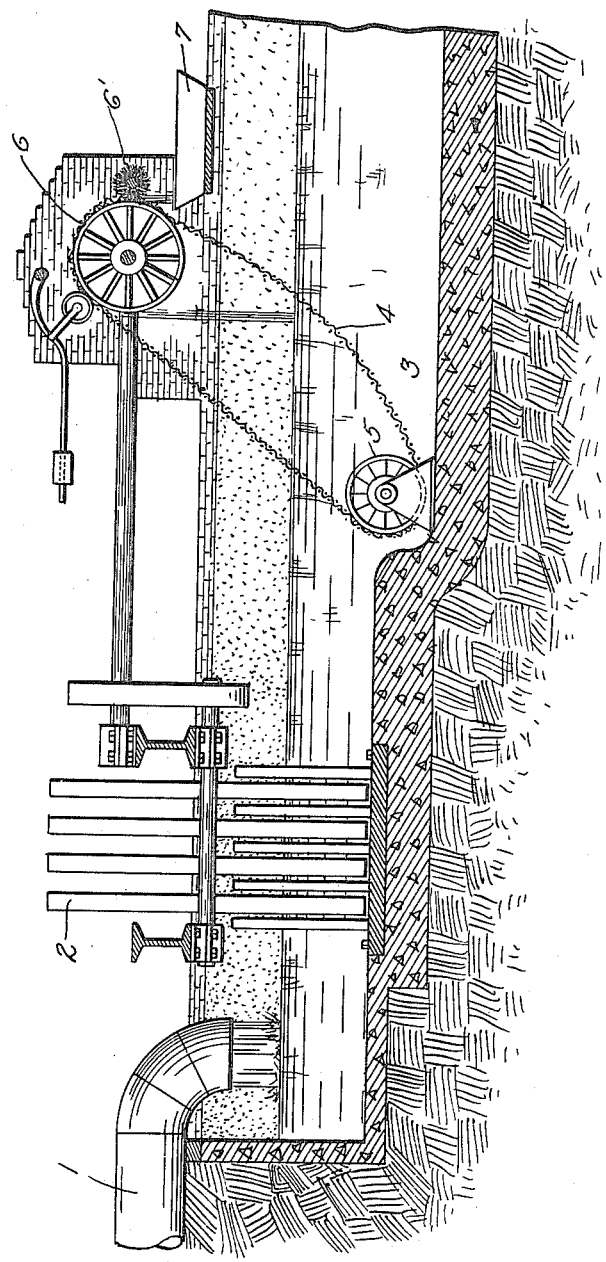
Inventor:
Walter H. Sawyer
By Ellis Spear Jr.
Attorney

UNITED STATES PATENT OFFICE.

WALTER H. SAWYER, OF AUBURN, MAINE.

METHOD OF TREATING SEWAGE.

1,242,986.    Specification of Letters Patent.    Patented Oct. 16, 1917.

Application filed February 1, 1917. Serial No. 145,846.

*To all whom it may concern:*

Be it known that I, WALTER H. SAWYER, a citizen of the United States, residing at Auburn, county of Androscoggin, State of Maine, have invented certain new and useful Improvements in Methods of Treating Sewage, of which the following is a specification.

This invention relates to the treatment of sewage or other waste, consisting of a very large volume of water with a relatively small amount of matter to be recovered, and in which there is present a fibrous content.

I shall discuss my invention particularly in terms of sewage as its well known extreme degree of watery solution, heretofore considered solely as a negative factor to be coped with at great trouble and expense, is turned to advantage in my process by a recognition of its possibilities and a utilization of its very volume.

This utilization of an obstacle together with a similar advantage gained by the salvaging as a valuable by-product of the troublesome fiber factor, as will be explained later, is of very great practical importance when it is considered that the whole enterprise of sewage disposition was founded on the abatement of a nuisance and impelled by public necessity. Under such conditions every item which can relieve the expense by creating a value is of relatively great importance.

My invention is particularly applicable to the treatment of practically all sewages having a fibrous content, and, in discussing it, I shall consider it particularly in that connection, and in a connection with the treatment of sewage either for the recovery of valuable matters contained therein, or for the purpose of producing a harmless effluent capable of discharge into streams or tide waters without pollution. In considering my invention in its broader aspects, it is necessary to bear in mind certain fundamental principles which run through the various applications of which my invention is capable.

One of the difficulties which has rendered a commercial treatment of sewage sludges difficult and expensive has been that of eliminating the water from the sludges which are formed in the various processes of sewage treatment. These sludges from sewage contain water varying in proportions from 80% to 95%, and it is the elimination of this water by any practical commercial means and at any reasonable cost that has proved one of the chief obstacles in the disposition of sewage sludges or the recovery of valuable matters therefrom.

I have discovered that the greater part of the difficulty in practical sludge drying has been due to a failure to recognize the inherent differences of certain sludge elements and their relation to the difficulties of dewatering by application of heat. It has, of course, been known that almost all sewage contains paper and other fiber containing material of various sorts, but the persistent fiber present in almost all sludges, while to some extent recognized as present, has apparently not been treated as a related factor in dewatering by application of heat.

It is the presence of this fiber which in any ordinary steam heated apparatus forms an insulating coating, or in thermal driers where the products of combustion are passed through the material to be dried, forms nodules or balls within which the water is retained.

The difficulty of balling up has been recognized and discussed. In ordinary forms of drying apparatus of types successfully used for drying clay, cement and similar materials have proven quite useless for this very reason, and special mechanism and special driers have been devised (see British Patent 7822 of 1913) to overcome the balling. This all has meant additional expense.

The tendency to form insulating coatings above referred to has not, as far as I am aware, been discussed by any of the authorities, but my discussion is based on my own tests and experiments. Furthermore as soon as the sewage or sludge is condensed the fibers become associated and felt, thus forming an element of ever-increasing difficulty of handling as condensation goes on.

The primary object in the treatment of sewage is to obtain as clear, sterile and organic-free an effluent as is practicable. In such treatment, the separtion of the liquid and solid matter has been effected so as to secure a clear effluent which if sufficiently sterile and organic-free may be at once discharged into river or tidal water, or if still polluted may be subjected to further treatment. In my method of treatment, however, during the separation of liquid and solid in the sewage, I deliberately take as an effluent from the step one containing as much organic matter in suspension, but free from fibrous content, as is practicable with the object of subjecting it to a subsequent separation or treatment which will at once yield an effluent of the desired character and also yield a sludge from which the water content may be economically eliminated.

In the practice of my invention, I contemplate the division of the sewage into the fibrous elements and another portion in a finely comminuted state mixed with the water of suspension which thereby becomes, when so separated, an element from which the finer organic matter may be precipitated by any chemical means, and the residue substantially freed from water by the application of heat. This is possible on account of the preliminary elimination of fibrous matter which if left with the finer organic matter would, as previously stated, form insulating coatings on the heating surfaces used, or if direct heat driers are used, would tend to form nodules or balls, the interior of which would be left in a moist condition.

These desired results may be effected in general in two different ways, one by the elimination of the water as water of suspension, carrying down with it the finely divided matter in suspension, while passing on the fibrous matter, as is set forth in my previous application, Serial No. 125,755, filed October 14, 1916, or, as I shall more fully disclose herein, by comminuting the non-fibrous organic matters of the sewage so as to secure as complete a suspension of these matters as possible, and effecting as complete a dispersal of the fiber through the water so that it will be as isolated as possible, and then in separating the fibrous element from the suspended matter and the water of suspension by some suitable process of removal which shall leave the finely divided matter with the water of suspension to as large an extent as possible.

My present invention, while bearing the above stated general similarity to that set forth in my previous application, may be still further differentiated by pointing out that while the invention of my previous application relates more particularly to the separation of the fibrous matter from sewage sludges previously precipitated, my present invention relates more particularly to the separation of the fibrous matter from raw sewage which has been merely mechanically comminuted to effect the suspension of all non-fibrous organic matter.

My present invention is not to be confused with the ordinary screening of sewage, the object of which is to remove all organic matter practicable, whether fibrous or non-fibrous, leaving as clear an effluent as is practicable. The purpose of such fine screening is in sharp contradistinction from the separation of the fibrous element under my method even though that separation be effected by screening, because it is my purpose to pass on for further treatment in the water as water of suspension and in finely divided state therein as large a percentage of the non-fibrous organic matter as practicable, and to that end I deliberately comminute the non-fibrous organic matter of the sewage, thus differing from the object of ordinary fine screening, which is to remove as large a portion of organic matter as possible, whether fibrous or non-fibrous.

By effecting an initial removal of the fibrous element I not only facilitate all subsequent steps, but I am able to utilize the very extremity of the dilution as a factor in capturing the fiber itself. As before stated, the fiber of condensed sewage or sludge becomes increasingly persistent as it gains coherence. By utilizing its initial state of comparative isolation in the vast volume of water I am able to collect and handle the fiber in a state of isolation with comparative ease and freedom from annoying mat. In $8\frac{1}{3}$ million pounds of sewage there are 2000 pounds of solids in suspension, or a dilution of 1 to 4000. About 10% of the solid is fiber corresponding to a dilution of 1 to 40000. This fiber so collected in my process may be reclaimed commercially, and makes satisfactory paper stock, utilizable for many purposes.

In the practice of my invention, the apparatus employed may be of different types in accordance with different conditions and different sewages. The step of the separation of the fiber from the sewage may be accomplished perhaps most advantageously by screens of which various types are well known and available on the market, although such screens may require some modification, such as the application of a squeeze roll or some variation in the doffing mechanism on account of the different purposes for which they would be used in the practices of my invention.

In order to make my invention more clear, I have shown in the accompanying drawing a somewhat diagrammatic lay-out of equipment for the practice of my invention. Throughout specification and drawing like reference numerals are employed to indicate corresponding parts.

Referring to the drawings and in explanation thereof, I have indicated at 1 a sewage supply which may be of any type adapted to the construction of the delivery end of a main system of sewage disposal.

At 2, I have indicated a comminuter which may be of any desired type adapted by agitation or otherwise to reduce the non-fibrous organic content of the sewage to a finely divided state and to bring it to as complete and uniform a state of suspension as practicable. It may be noted at this point that where sewage is pumped from the main arteries of a trunk system, the pumping itself may with pumps of suitable construction sufficiently comminute and bring to a suitable state of suspension the organic matter of the sludge in its water of suspension.

From the point of comminution and suspension the sewage enters suitable apparatus, as for example the tank 3, in which is disposed the screen 4. The screen 4, as above stated, may be of any well known type or any adaptation thereof. I have illustrated a screen of the general Carshalton type. This screen consists of an endless belt of screening 4 carried over drums 5 and 6, the drum 5 being submerged below the sewage level of the tank and the drum 6 driven by any suitable connection.

This screen, however, is preferably equipped with pressure rolls for squeezing or wringing as far as possible, all of the water and matter suspended therein from the fibrous content as it is carried up on the screen, previous to its doffing which in the form shown is effected by the members 6 which discharge the fibrous content laterally into any suitable receptacle as at 7.

The rate of travel of the screen 4 is proportioned to the velocity of the sewage current in which it is run. The adjustment should be so made as to catch the fiber and carry it up as it forms on the screen in its isolated or discontinuous state in which it can be readily removed and in which it has no entraining or trapping tendency on the suspended matter intended to be left in its water of suspension. It will be seen that if the screen runs too slowly relative to the flow it will coat in a felted mat and entrain the suspended matter and act as a filter to the passing flow.

During this screening operation, the passing sewage is constantly depositing its fibrous content on the face of the screen, and the screen by its travel is constantly presenting a fresh surface previously brushed in the last doffing for the reception of a new layer of fiber. The resultant flow below the screen is therefore substantially freed from any fibrous element while holding in suspension substantially all of the non-fibrous organic matter. Such a flow may then be treated by any of the well known methods, as by treatment with sulfur-dioxid, as in the Miles acid process or by any other method.

The fibrous matter may be washed and degreased and used for coarse grades of paper or any other purpose to which fibers may be adapted. The wash water of the fibers may be returned to the raw sewage in order that any of the fine matter which may have been entrained in the fibers may be recovered with subsequent sludges.

The sludges resulting from this method of treatment have a higher fertilizing value than sludges containing the fibrous matter, as such fibrous matters, being generally hydrocarbons in themselves, have no great value as fertilizers while they are very valuable as paper stock.

The practice of my invention may be varied somewhat under varying conditions, and apparatus of various forms may be used. My method may also be used independently of or in conjunction with other methods, all without departing from the spirit of my invention if within the limits of the appended claims.

What I therefore claim and desire to secure by Letters Patent is:

1. The method of treating sewage consisting in reducing the non-fibrous organic matter therein to a finely comminuted state, in suspension therein, in removing the fibrous element from the suspended matter and water of suspension and in eliminating the water of suspension from the comminuted non-fibrous organic matter and drying the fibrous material.

2. In a method of treating sewage consisting in reducing the non-fibrous organic matter therein to a finely comminuted state, in suspension therein, in removing the fibrous element from the suspended matter and water of suspension and in eliminating the water of suspension from the comminuted non-fibrous organic matter.

3. The method of treating sewage consisting in reducing the non-fibrous organic matter therein to a finely comminuted state, in suspension therein, and in removing the fibrous element from the suspended matter and water of suspension.

4. The step in the treatment of sewage consisting in suspending the non-fibrous organic matter in a finely divided state therein and in removing the fibrous content from said suspended matter and its water of suspension, while said finely divided matter is so suspended.

5. The preliminary step in the treatment of sewage preparatory to a removal of solids in suspension consisting in reducing the fibrous matter and distributing it throughout the water in a state of disassociation and in removing said fibrous matter in a disassociated state.

6. The preliminary step in the treatment of sewage preparatory to a removal of solids in suspension consisting in reducing the non-fibrous organic matter to a finely comminuted state in suspension and in reducing the fibrous matter and distributing it throughout the water in a state of disassociation and in removing said fibrous matter in a disassociated state.

In testimony whereof I affix my signature in presence of two witnesses.

WALTER H. SAWYER.

Witnesses:
 MARION F. WEISS,
 VICTORIA LOWDEN.